Patented Feb. 25, 1930

1,748,901

UNITED STATES PATENT OFFICE

EUGEN REISZ, OF BERLIN-DAHLEM, GERMANY

MEMBRANE FOR ELECTROSTATIC LOUD-SPEAKERS

No Drawing. Application filed February 6, 1929, Serial No. 338,049, and in Germany March 13, 1928.

This invention relates to processes for the manufacture of membranes for electrostatic loud speakers.

An electrostatic loud speaker generally comprises a membrane of thin rubber or similar insulating material which is stretched over a plate of substantial area, the side of the rubber remote from the plate being coated with a thin metal foil. It will be seen that with this arrangement the metal coating forms one electrode and the plate the other of a condenser whose dielectric is constituted by the rubber or the like so that if voltages varying at acoustic frequency be applied between these electrodes the electrostatic strain in the dielectric will tend correspondingly to vary and thereby cause acoustic movements of the membrane. It is very desirable that the natural frequency of such a membrane should be low in the frequency scale and it is for this reason that the membrane is generally formed of a thin rubber sheet having therefore a low rigidity. In practice, however, this advantage which should be given by a thin rubber membrane is lost owing to the fact that, in order to stick the metallic coating thereon, there has hitherto been employed adhesives which resinify and become stiff, thus rendering the membrane as a whole comparatively rigid and raising its natural resonance frequency.

One object of the present invention is to provide a process for the manufacture of the membrane of an electrostatic loud speaker whereby this disadvantage is removed.

A further object is to provide an electrostatic loud speaker having a membrane coated with metal and which is and will remain of low rigidity and natural frequency.

These objects are achieved in accordance with this invention by sticking metal foil upon a rubber or similar membrane for use in an electrostatic speaker by means of a vegetable oil which does not attack the rubber and which excludes air and thus does not become appreciably stiff and rigid. A vegetable oil which is admirably suited for carrying out the present invention is castor oil.

Electrostatic loud speakers made in accordance with this invention may in general construction be of any of the forms comprising membrances as hereinbefore set forth. Such forms of general construction are well known to those skilled in the art and it is therefore not deemed necessary to described them here, since the present invention is not concerned with such constructions but merely with providing a new and improved method of sticking the metal foil or coating upon the rubber or other insulating material of the membrane.

What I claim is:—

1. A process for manufacturing a metallic coated insulating membrane for use in an electrostatic loud speaker and which includes the step of sticking said metallic coating upon the insulating membrane solely by means of a vegetable oil.

2. A process for manufacturing a metallic coated insulating membrane for use in an electrostatic loud speaker and which includes the step of sticking said metallic coating upon the insulating membrane by means of castor oil.

3. A process for manufacturing a metallic coated insulating membrane for use in an electrostatic loud speaker and which includes the step of sticking metallic foil coating upon the insulating membrane solely by means of a vegetable oil.

4. A process for manufacturing a metallic coated insulating membrane for use in an electrostatic loud speaker and which includes the step of sticking metallic foil coating upon the insulating membrane by means of castor oil.

5. A process for manufacturing a metallic coated thin rubber membrane for use in an electrostatic loud speaker and which includes the step of sticking said metallic coating upon the thin rubber membrane solely by means of a vegetable oil.

6. A process for manufacturing a metallic coated thin rubber membrane for use in an electrostatic loud speaker and which includes the step of sticking said metallic coating upon the thin rubber membrane by means of castor oil.

7. A process for manufacturing a metallic coated thin rubber membrane for use in an electrostatic loud speaker and which includes the step of sticking metallic foil coating upon the thin rubber membrane solely by means of a vegetable oil.

8. A process for manufacturing a metallic coated thin rubber membrane for use in an electrostatic loud speaker and which includes the step of sticking metallic foil coating upon the thin rubber membrane by means of castor oil.

9. An electrostatic loud speaker comprising an insulating membrane, a metallic coating thereon and a pure vegetable oil attaching said coating upon said membrane.

10. An electrostatic loud speaker comprising an insulating membrane, a metallic coating thereon and castor oil attaching said coating upon said membrane.

11. An electrostatic loud speaker comprising an insulating membrane, metallic foil thereon and a pure vegetable oil attaching said metallic foil upon said membrane.

12. An electrostatic loud speaker comprising an insulating membrane, metallic foil thereon and castor oil attaching said metallic foil upon said membrane.

13. An electrostatic loud speaker comprising a thin rubber membrane, metallic foil thereon and castor oil attaching said metallic foil upon said membrane.

In testimony that I claim the foregoing as my invention I have signed my name this 23rd day of January, 1929.

EUGEN REISZ.